US007736080B2

(12) United States Patent
Smith, Jr. et al.

(10) Patent No.: US 7,736,080 B2
(45) Date of Patent: Jun. 15, 2010

(54) WRITING INSTRUMENT WITH A TAPE FLAG DISPENSER

(75) Inventors: Danny R. Smith, Jr., Glen Ellyn, IL (US); Brian D. Furlong, Westchester, IL (US); Jaime Arenas, Oak Park, IL (US)

(73) Assignee: Sanford L.P., Freeport, IL (US)

( * ) Notice: Subject to any disclaimer, the term of this patent is extended or adjusted under 35 U.S.C. 154(b) by 0 days.

(21) Appl. No.: 12/422,003

(22) Filed: Apr. 10, 2009

(65) Prior Publication Data

US 2009/0196674 A1 Aug. 6, 2009

Related U.S. Application Data

(62) Division of application No. 11/039,512, filed on Jan. 18, 2005, now Pat. No. 7,517,167.

(51) Int. Cl.

| | |
|---|---|
| ***B43K 29/00*** | (2006.01) |
| *A47K 10/24* | (2006.01) |
| *B65G 59/00* | (2006.01) |
| *B65H 1/00* | (2006.01) |
| *B65H 83/00* | (2006.01) |
| *B65H 85/00* | (2006.01) |
| *G07F 11/00* | (2006.01) |

(52) U.S. Cl. ........................... 401/195; 221/45; 221/52; 221/199

(58) Field of Classification Search ................... 401/52, 401/195, 292; 221/45, 52, 199; 7/160
See application file for complete search history.

(56) References Cited

U.S. PATENT DOCUMENTS

| | | | |
|---|---|---|---|
| 2,073,719 | A | 3/1937 | Ross |
| 2,224,470 | A | 12/1940 | Boust |
| 4,416,392 | A | 11/1983 | Smith |
| 4,667,828 | A | 5/1987 | Samuelson |

(Continued)

FOREIGN PATENT DOCUMENTS

| | | |
|---|---|---|
| DE | 451 884 | 11/1927 |

(Continued)

OTHER PUBLICATIONS

International Research Report for International Application No. PCT/US2005/001831 dated Mar. 7, 2006.

(Continued)

*Primary Examiner*—Gregory L Huson
*Assistant Examiner*—Ryan A Varnum
(74) *Attorney, Agent, or Firm*—Marshall, Gerstein & Borun LLP

(57) ABSTRACT

A writing instrument has a barrel, a flag dispenser partially inserted into the barrel, and a rotating or sliding cover that engages with and covers the flag dispenser. In different positions, the rotating or sliding cover enables various functions of the flag dispenser. For example, the cover may be moved into a position to enable withdrawal of tape flags by a user. The cover may also be configured to move into a position that covers and protects the tape flags. In refillable embodiments of the writing instrument, the cover may also be removed to enable a flip cover portion of the flag dispenser to be opened to provide access to a tape flag chamber.

13 Claims, 6 Drawing Sheets

U.S. PATENT DOCUMENTS

| | | | | |
|---|---|---|---|---|
| 4,770,320 | A | 9/1988 | Miles et al. | |
| 4,796,781 | A | 1/1989 | Windorski | |
| 4,812,069 | A | 3/1989 | White et al. | |
| 4,907,825 | A | 3/1990 | Miles et al. | |
| 4,921,127 | A | 5/1990 | Windorski | |
| 4,957,233 | A | 9/1990 | Samuelson | |
| 4,986,440 | A | 1/1991 | Windorski | |
| 4,989,801 | A | 2/1991 | Thomas et al. | |
| 4,993,590 | A | 2/1991 | Windorski | |
| 5,024,547 | A | 6/1991 | Mui et al. | |
| 5,059,435 | A | 10/1991 | Sloan et al. | |
| 5,072,686 | A | 12/1991 | Falco | |
| 5,080,255 | A | 1/1992 | Windorski | |
| 5,158,205 | A | 10/1992 | Bodziak et al. | |
| 5,165,570 | A | 11/1992 | Windorski et al. | |
| 5,167,346 | A | 12/1992 | Bodziak | |
| 5,299,712 | A * | 4/1994 | Carlson et al. | 221/45 |
| 5,411,168 | A | 5/1995 | Mertens et al. | |
| 5,670,014 | A | 9/1997 | Mendelovich et al. | |
| 5,697,518 | A | 12/1997 | Callahan, Jr. | |
| 5,769,270 | A | 6/1998 | Fujisawa et al. | |
| 5,904,806 | A | 5/1999 | Mendelovich et al. | |
| 6,135,661 | A * | 10/2000 | Houser | 401/195 |
| 6,210,768 | B1 | 4/2001 | Blok et al. | |
| 6,283,661 | B1 | 9/2001 | Connors | |
| 6,354,754 | B1 | 3/2002 | Pan | |
| 6,398,178 | B1 | 6/2002 | Azola et al. | |
| 6,719,472 | B2 | 4/2004 | Windorski et al. | |
| 7,517,167 | B2 | 4/2009 | Smith et al. | |
| 2003/0000958 | A1 * | 1/2003 | Windorski et al. | 221/199 |
| 2004/0234326 | A1 | 11/2004 | Erlebacher et al. | |
| 2005/0058497 | A1 | 3/2005 | Marschand | |

FOREIGN PATENT DOCUMENTS

| | | |
|---|---|---|
| DE | 297 09 080 | 10/1998 |
| DE | 100 30 440 | 1/2002 |
| EP | 0 416 181 | 3/1991 |
| GB | 2 106 044 | 4/1983 |
| JP | 11-139081 | 5/1999 |
| JP | 2000-025386 | 1/2000 |
| WO | WO-03/002357 | 1/2003 |

OTHER PUBLICATIONS

International Search Report and Written Opinion for Application No. PCT/US2005/001831, dated Jun. 13, 2006.

Invitation to Pay Additional Fees and Communication Relating to the Results of the Partial International Search Report for International Application No. PCT/US2005/001831, dated Mar. 7, 2006.

* cited by examiner

FIG. 11
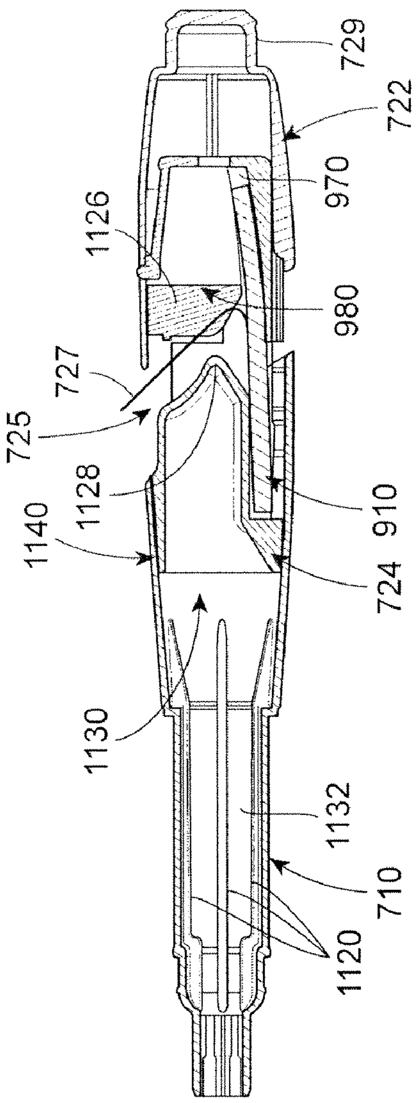
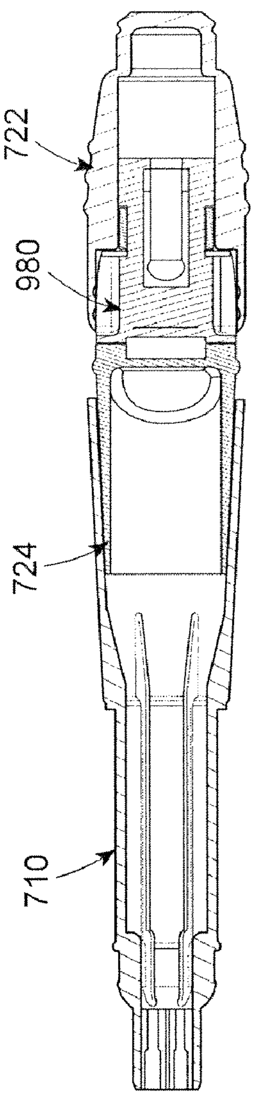
FIG. 12
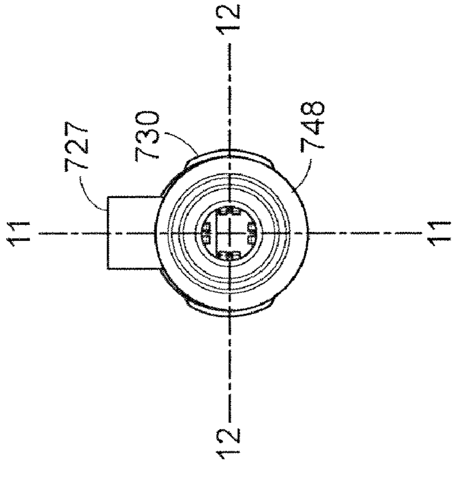
FIG. 10

WRITING INSTRUMENT WITH A TAPE FLAG DISPENSER

RELATED APPLICATION DATA

This is a divisional of U.S. patent application Ser. No. 11/039,512, filed Jan. 18, 2005 (U.S. Pat. No. 7,517,167), which claims the priority benefit of U.S. provisional patent application No. 60/537,430, filed Jan. 17, 2004, the entire contents of each of which are expressly incorporated herein by reference.

FIELD OF THE DISCLOSURE

The disclosure relates generally to writing instruments and, more particularly, to a writing instrument with a tape flag dispenser.

BACKGROUND OF THE DISCLOSURE

Writing instruments such as highlighters, markers, pens, and pencils are used to mark passages in books, magazines, newspapers, and other printed publications. Highlighters of a variety of colors are very commonly used to emphasize text in printed publications. For instance, Sanford L.P. (Bellwood, IL.) produces ACCENT® highlighters, which come in many different colors. Such highlighters are well received by students, teachers, and those in the legal profession.

Further, people may mark pages of printed publications. One method of locating a particular page of a printed publication such as a book is to apply a tape flag to mark a page for future reference. In particular, the tape flag may include an adhesive portion and a non-adhesive portion. The adhesive portion may be applied to a surface (e.g., a page of the book) while the non-adhesive portion may be a visual indicator. For example, the non-adhesive portion may be a variety of colors and/or shapes. Another use of tape flags is to mark a section of a page. Accordingly, the non-adhesive portion may also be a variety of letters, numbers, and/or messages. For example, the non-adhesive portion may include a message such as “Sign Here,” “Notarize,” “Initial Here,” or “Sign & Date.”

Because a variety of writing instruments and tape flag dispensers are used to mark passages in printed publications, this necessarily requires purchasing, carrying, and/or using many separate individual products. Integrating a writing instrument and a tape flag dispenser into a single product in accordance with the present invention can reduce the inconveniences of purchasing, carrying, and/or using many separate individual products.

BRIEF DESCRIPTION OF THE DRAWINGS

FIG. 10 is a plan view of the writing instrument configured to dispense tape flags of FIGS. 7 and 8.

FIGS. 11 and 12 are cross sections taken along lines 11-11 and 12-12 of FIG. 10 of the writing instrument configured to dispense tape flags of FIGS. 7 and 8.

DETAILED DESCRIPTION

Figure 2:
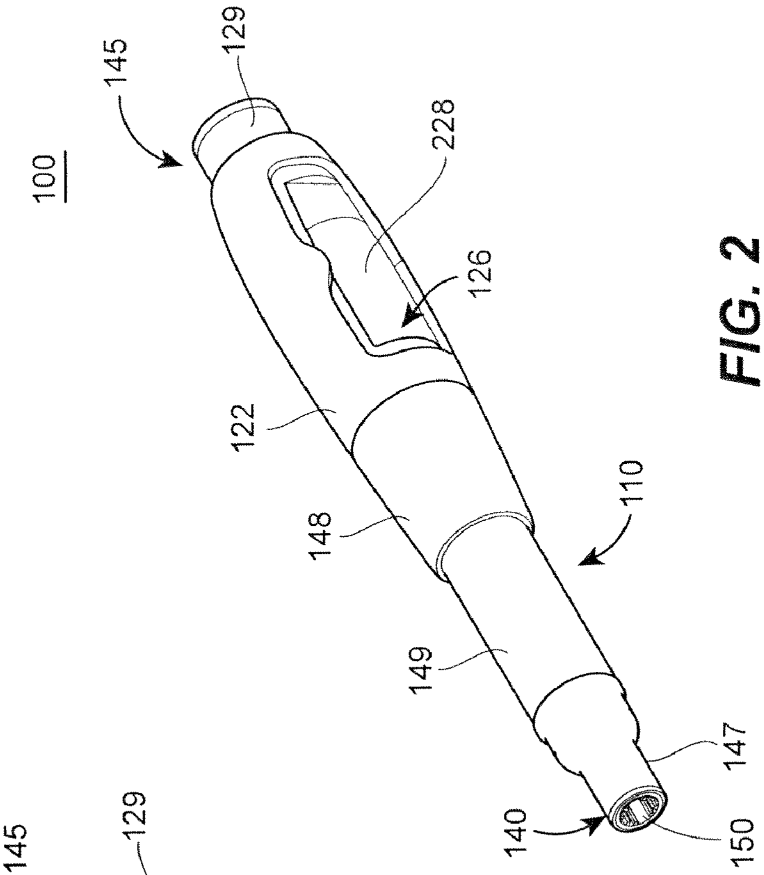
FIGS. 1 and 2 show perspective views of a first configuration of a writing instrument configured to dispense tape flags in accordance with the present invention.
Figure 1:
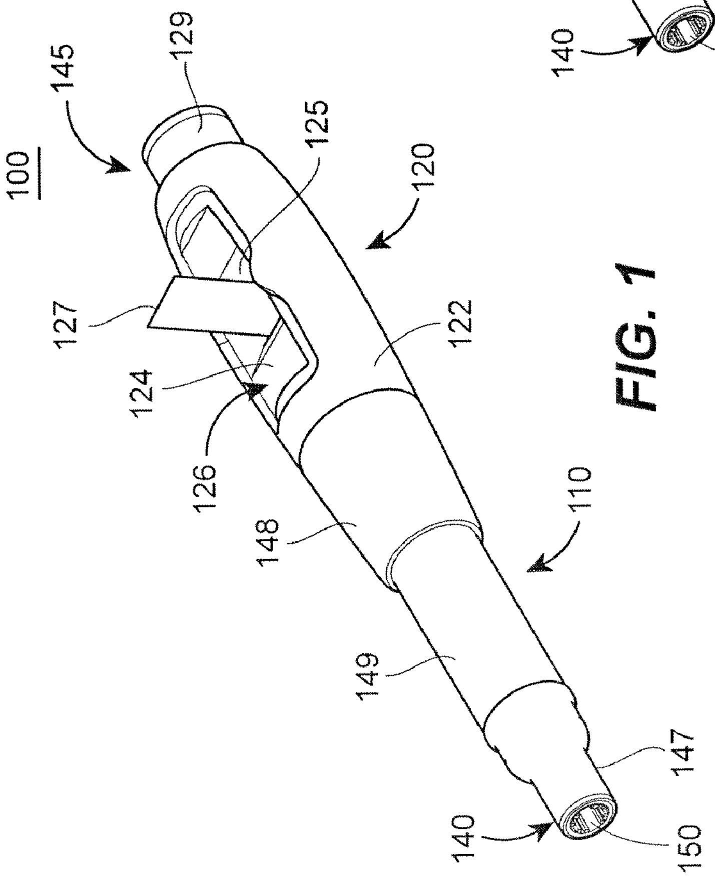

Referring to FIGS. 1 and 2, a writing instrument generally designated 100 includes a barrel portion 110 and a flag-dispensing portion 120. The writing instrument 100 may be, but is not limited to, a highlighter, a marker, a pen, or a pencil. The writing instrument 100 may have a cylindrical bottle-like configuration extending from a first end 140 to a second end 145. In particular, the barrel portion 110 may include a neck section 147 proximate to the first end 140, a tubular section 149 extending toward the second end 145 from the neck section 147 to provide an exterior grip surface, and a cone-like section 148 extending toward the second end 145 from the tubular section 149. The neck section 147 may be configured with a tip holder 150 located at the first end 140 and adapted to hold a protruding marking element 151 (FIG. 3) to apply a fluid or ink to a surface (e.g., a page in a book).

The sheet or flag dispensing portion 120 includes a rotating cover portion 122 and a dispensing plug 124. The dispensing plug 124 is configured to be inserted into and to engage the cone-like section 148 of the barrel portion 110. The dispensing plug 124 is configured to store a stack of tape flags. The rotating cover portion 122 has a generally cylindrical shape and is configured to engage onto and circumferentially cover the dispensing plug 124. The rotating cover portion 122 has a tape-flag opening 126 with dimensions suitable for tape flags to pass therethrough.

The rotating cover portion 122 rotatably engages onto the dispensing plug 124 so that rotating cover portion 122 may rotate either partially or completely with respect to its initial circumferential location about the dispensing plug 124. For example the rotating cover portion 122 and the dispensing plug 124 may additionally have tabs or mechanical stops (not shown) that limit the range of rotation of the cover portion 122. Further, the rotating cover portion 122 and the dispensing plug 124 may have detents, tabs, nubs, or grooves that align the rotating cover portion 122 at specific desired positions with respect to the dispensing plug 124.

The dispensing plug 124 has a mouth portion 125 adapted to dispense tape flags, as further discussed below. A stack of tape flags may be inserted into the dispensing plug 124 of the flag dispensing portion 120 so that the stack of tape flags is disposed longitudinally in the dispensing plug 124. In FIG. 1, a protruding tape flag 127 is shown extending from the mouth portion 125 of the dispensing plug 124, and through the tape-flag opening 126 in the rotating cover portion 122.

The dispensing plug 124 also has a nub portion 129 located at the second end 145 of the writing instrument 100. The nub portion 129 is dimensioned so that it snugly fits into a cap (not shown) that may also snugly fit onto neck section 147. The cap may be used to protect a writing tip when the writing instrument is not in use.

FIG. 2 shows another view of the writing instrument 100. FIG. 2 illustrates the writing instrument 100 with the rotating cover portion 122 rotated into a different position than is shown in FIG. 1. In FIG. 1, writing instrument 100 was shown with the tape-flag opening 126 of the rotating cover portion 122 aligned with the mouth portion 125 of the dispensing plug 124. In FIG. 2, the rotating cover portion 122 is rotated so that the tape-flag opening 126 is not aligned with the mouth portion 125. Rather, the tape-flag opening 126 is aligned with a side portion 228 of the dispensing plug 124. In this position, the rotating cover portion 122 covers the mouth portion 125 and protects any tape flags that may otherwise be extending from the mouth portion 125. Thus, depending on the orientation of the rotating cover portion 122, the tape-flag opening 126 may expose either the mouth portion 125 or the side portion 228 of the dispensing plug 124.

Additionally, the rotating cover portion 122 may also be rotated to expose a sheet or rear chamber 525 (shown in FIG. 5 and further discussed below) that houses a supply of tape flags. When the rotating cover portion 122 is rotated to expose the rear chamber 525, a user can access the rear chamber through the tape-flag opening 126, and may thus insert a supply of tape flags into the rear chamber 525. Alternatively, or in addition, the writing instrument 100 may be configured so that the rotating cover portion 122 is removed altogether to expose the rear chamber 525. In this implementation, a user can access the rear chamber by pulling the rotating cover portion 122 in the direction of the second end 145 and removing the rotating cover portion 122 from the writing instrument 100.

Figure 3:
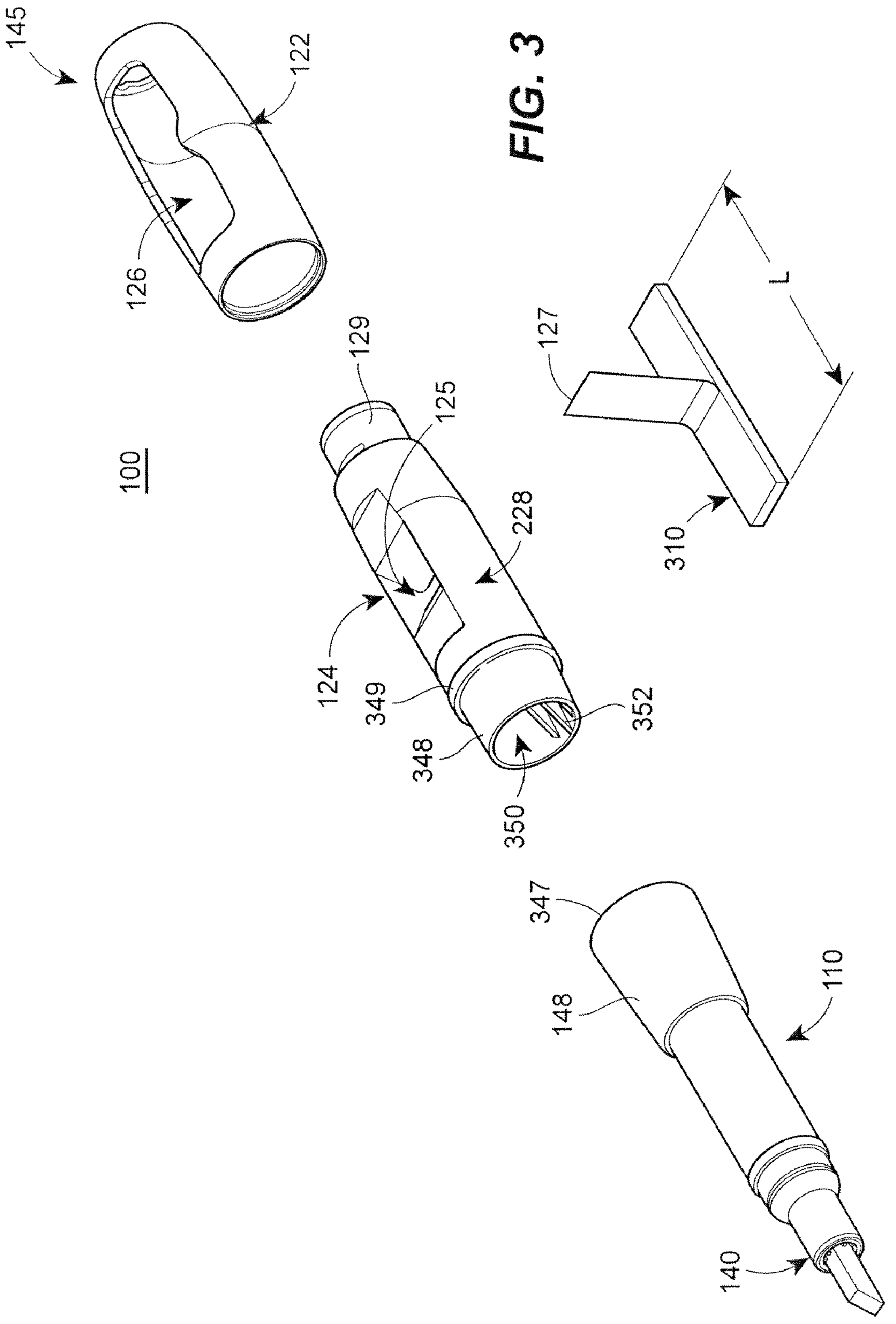
FIG. 3 illustrates an exploded view of the writing instrument configured to dispense tape flags of FIGS. 1 and 2.

FIG. 3 presents an exploded view of the writing instrument 100 from FIGS. 1 and 2. FIG. 3 shows the barrel portion 110, the dispensing plug 124, and the rotating cover portion 122. Also shown is a stack of tape flags 310 that may be inserted into the dispensing plug 124. The stack of tape flags 310 includes the tape flag 127 shown protruding from the writing instrument 100 in FIG. 1. Examples of stacks of tape flags that may be used include POST-IT® brand tape flags produced by 3M Company. Tape flags may be made of plastic or paper strips. The stack of tape flags may alternatively be replaced by a stack of adhesive note pads. Additionally, some implementations of the writing instrument 100 may use a tape-flag cartridge in place of the stack of tape flags 310.

The barrel portion 110, the dispensing plug 124, and the rotating cover portion 122 are each separately made from injection-molded plastic. In other implementations of the writing instrument 100, the barrel portion 110 and the dispensing plug 124 may be made of a single piece. Also, other materials may be used in forming the components of the writing instrument 100, such as other partially pliable materials generally suitable for a writing instrument.

As illustrated in FIG. 3, the dispensing plug 124 has a hollow plug portion 348 extending along a central axis of the dispensing plug 124 in the direction of the first end 140. The hollow plug portion 348 is dimensioned to fit snugly into the cone-like section 148 of the barrel portion 110, and forms a permanent or removable seal with the cone-like section 148, as discussed below. During such insertion, a ridge 349 of the plug portion 348 engages a front edge 347 of the cone-like section 148. The hollow plug portion 348 has an opening 350 that allows an internal region of the dispensing plug 124 to communicate with an internal region of the barrel portion 110 in writing instrument 100.

Figure 4:
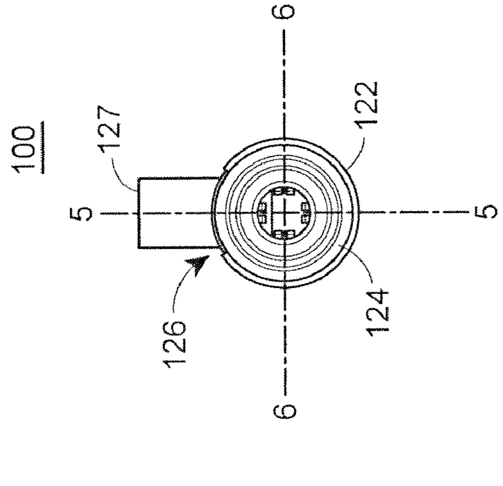
FIG. 4 is a plan view of the writing instrument configured to dispense tape flags of FIGS. 1 and 2.

FIG. 4 is a plan view of the writing instrument 100, in the direction facing the first end 140. FIG. 4 shows the rotating cover portion 122 circumferentially mounted around the dispensing plug 124. Also depicted in this figure is the tape-flag opening 126 in rotating cover portion 122. The protruding tape flag 127 is shown extending through the tape-flag opening 126.

Figure 5:
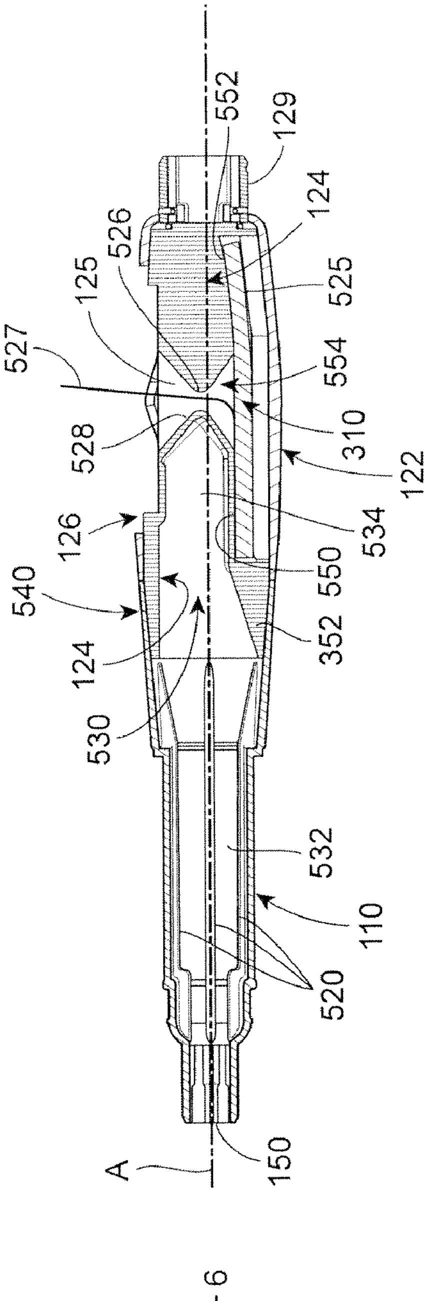
FIGS. 5 and 6 are cross sections taken along lines 5-5 and 6-6 of FIG. 4 of the writing instrument configured to dispense tape flags of FIGS. 1 and 2.
Figure 6:
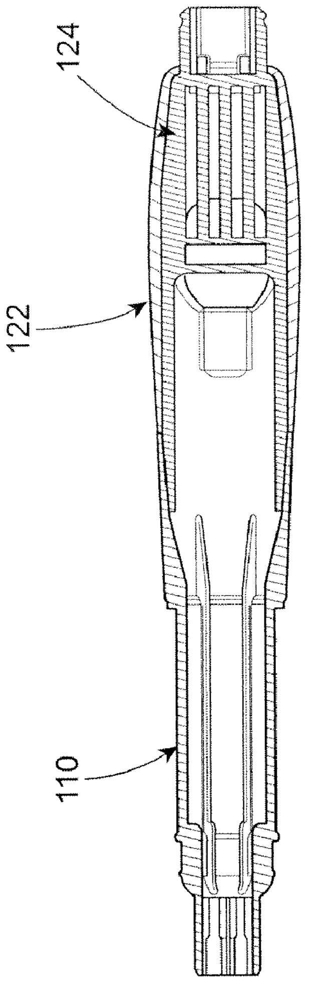

FIGS. 5 and 6 are cross sections of the writing instrument 100 though the longitudinal sections 5-5 and 6-6, respectively, depicted in FIG. 4. FIGS. 5 and 6 show the barrel portion 110, the rotating cover portion 122, and the dispensing plug 124.

As illustrated in FIG. 5, the dispensing plug 124 may have a rear chamber 525 that houses the stack of tape flags 310. The rear chamber 525 may be accessed by a user through the tape-flag opening 126. To provide access to the stack of tape flags, the rotating cover portion 122 may be rotated so that the tape-flag opening 126 is aligned with the rear chamber 525, allowing the stack of tape flags to be inserted into the rear chamber 525 through the rotating cover portion 122. To facilitate loading and unloading of tape flags into the writing instrument 100, the tape-flag opening 126 is preferably dimensioned so that a stack of tape flags can be readily inserted through the tape-flag opening 126. Alternatively, or in addition, the writing instrument 100 may be configured so that the rotating cover portion 122 is removed altogether to expose the rear chamber 525 so that tape flags may be loaded or unloaded from the rear chamber 525.

A user may load tape flags into the rear chamber 525 of the dispensing plug 124 when the tape-flag opening 126 is aligned with the rear chamber 525. The user may place the stack of tape flags 310 into the rear chamber 525, with an initial tape flag 127 inserted through the mouth portion 125 of the dispensing plug 124. Once tape flags have been loaded into the rear chamber 525 through the tape-flag opening 126, the tape-flag opening 126 may be rotated away from the rear chamber 525 to lock the stack of tape flags in place.

The stack of tape flags 310 may include tape flags that have adhesive material on one side of each tape flag. The adhesive material may allow the tape flags to be readily affixed and readily removed from a solid surface, such as paper, wood, metals, or glass. The adhesive material may be located only on a portion of the one side of each tape flag, making the tape flags readily detachable from surfaces on which they have been affixed.

When stored in a stack such as the stack 310, the tape flags may be arranged in a zig-zag configuration, alternating in the orientation of the tape flags' adhesive portion. This arrangement, as would be known to a skilled artisan, allows tape flags to be drawn from the stack one-by-one, with each tape flag pulling a subsequent tape flag into a position that makes the subsequent tape flag ready for use.

As shown in FIG. 5, an initial tape flag 527 protrudes from the mouth portion 125, in a position ready for use. The initial tape flag 527 extends from the rear chamber 525, where it is anchored onto the stack of tape flags 310. As shown, the adhesive portion of the initial tape flag 527 is affixed to a subsequent tape flag in the stack of tape flags 310. When a user pulls on the initial tape flag 527 to withdraw a flag from the writing instrument 100, the initial tape flag 527 in turn pulls on the subsequent tape flag. As the initial tape flag 527 is withdrawn form the mouth portion 125, the subsequent tape flag is drawn into the ready position, with a non-adhesive portion of the subsequent tape flag protruding from the mouth portion 125.

The dispensing plug 124 may have a throat portion defined by two nubs 526 and 528. The throat portion of the dispensing plug 124 is behind the mouth portion 125 of the dispensing plug 124. Tape flags drawn from the writing instrument 100 pass from the stack of tape flags 310 in the rear chamber 525, through the throat portion of the dispensing plug 124 (between the nubs 526 and 528), and finally through the mouth portion 125.

The nubs 526 and 528 may be dimensioned so that the throat portion of the dispensing plug 124 has an hourglass-shaped cross section, as shown in FIG. 5. The throat section may be dimensioned to facilitate the passage of tape flags therethrough. Similarly, the dimensions of the rear chamber may also be selected to facilitate the removal of tape flags.

These dimensions are preferably adapted to an intended size of the tape flags in the stack of tape flags 310.

A variety of tape flag sizes are contemplated. In one implementation, the writing instrument 100 is configured to dispense tape flags with a longitudinal stack length "L" (FIG. 3) of between 20 and 200 mm. The tape flags may have a width between 2 and 50 mm. The adhesive on a tape flag may cover between 5% and 100% of one or both surfaces of the tape flag. For example, a tape flag may have a length of approximately 44 mm, a width of approximately 10 mm, and an adhesive portion on one side of one surface, with the adhesive portion having a length of approximately 25 mm. A stack of such tape flags may have an initial height of 2 to 20 mm. The rear chamber 525 may then have a width, a length, and a depth that are 1 to 5 mm greater than the width, length, and height of the stack of tape flags.

The rear chamber 525 preferably is dimensioned to minimize shuttling of the stack of tape flags 310 as tape flags are withdrawn by a user. Accordingly, the rear chamber 525 may include first and second upper chamber walls 550, 552 that engage opposite ends of the stack of tape flags. The upper chamber walls 550, 552 engage only a portion of each end of the stack to facilitate withdrawal of a leading sheet through a gap 554 between the walls 550, 552. In one example, each of the first and second upper chamber walls 550, 552 engages less than approximately 40%, and preferably less than approximately ⅓, of the longitudinal stack length "L". By reducing the length across which the walls 550, 552 engage the stack length "L", the leading sheet may more easily be removed from the stack while minimizing the distance that the stack must slide or "shuttle" within the chamber 525. For example, the rear chamber 525 may have dimensions of approximately 12 mm wide, 27 mm long, and 4 mm deep, and the separation between the first and second upper chamber walls 550, 552 may be approximately 1.5 to 2.0 mm wide. The nubs 528, 526 may be coupled to the walls 550, 552, respectively, to define the throat portion, which is illustrated as being narrower than the gap 554. The narrower throat portion positions the leading sheet closer to a center of the mouth portion, thereby minimizing the required longitudinal length of the cover portion 122, and orienting the leading sheet closer to perpendicular to the axis of the writing instrument 100, thereby making it more easy to grasp by a user.

FIG. 5 further illustrates an interior cavity 530 that is formed when the dispensing plug 124 is connected with the barrel portion 110. The interior cavity 530 has a barrel-portion cavity 532, located inside the barrel portion 110, and a plug-portion cavity 534 located inside the dispensing plug 124. The internal cavity 530 has dimensions suitable for holding an ink cartridge (not shown). The ink cartridge may supply ink to a writing tip mounted in tip holder 150. The ink cartridge may be a container of ink or other suitable ink supply, such as an ink-soaked absorbent material. The plug-portion cavity 534 of internal cavity 530 may extend substantially into the dispensing plug 124 as shown. Thus, the internal cavity 530 overall is substantially larger than merely the barrel-portion cavity 532, and is suitable for holding large ink cartridges that would not otherwise fit completely into the barrel-portion cavity 532.

A set of baffles 520 is mounted in an interior portion of the barrel portion 110 to assist in holding an ink cartridge in place. During assembly of the writing instrument 100, the ink cartridge may be inserted into the barrel portion 110. The dispensing plug 124 may then be attached to the barrel portion 110, enclosing the ink cartridge in the interior cavity 530. A seal 540 may be formed between the dispensing plug 124 and the barrel portion 110 to firmly join these components 110 and 124. The seal 540 may be made of one or more circumferential locking rings formed onto the components 110 and 124. Alternatively, or in addition, the seal 540 may be formed of a heat-treated or pressure-activated adhesive.

Note that as shown, the barrel-portion cavity 532 of internal cavity 530 is substantially centered on a central axis of the writing instrument 100. However, to accommodate the rear chamber 525, the plug-portion cavity 534 may be substantially off-center from the central axis. To guide an ink cartridge into position when the dispensing plug 124 is attached onto barrel portion 110 during assembly, a ramp-shaped guide 352 is mounted inside plug-portion cavity 534. The guide 352 (also visible in FIG. 3), gradually pushes an end of the ink cartridge off-axis and into the plug-portion cavity 534 when the dispensing plug 124 is attached onto the barrel portion 110.

Figure 8:
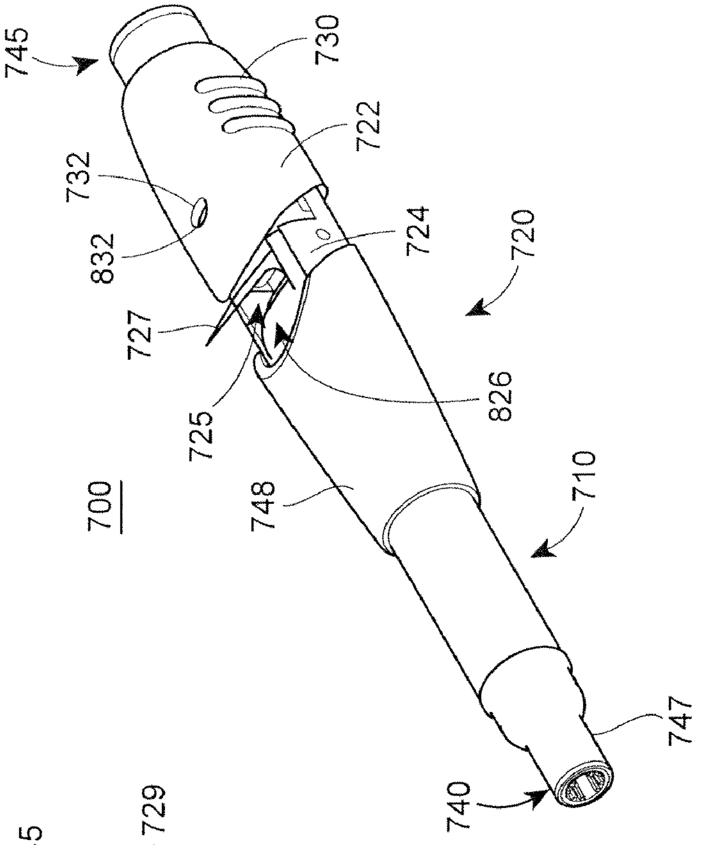
FIGS. 7 and 8 show perspective views of a second configuration of a writing instrument configured to dispense tape flags in accordance with the present invention.
Figure 7:
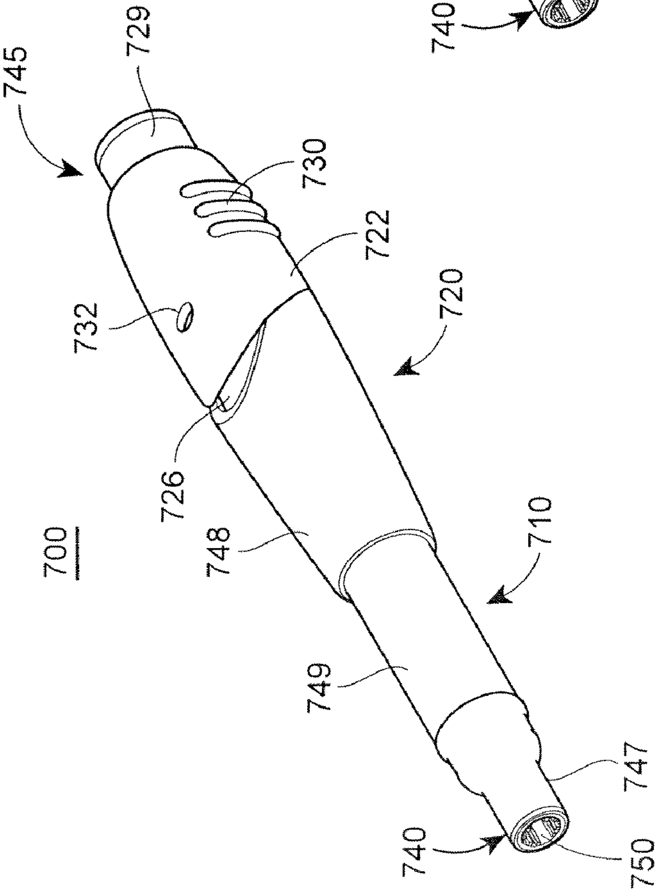

FIGS. 7 and 8 show another embodiment 700 of a writing instrument adapted to dispense tape flags. Writing instrument 700 includes a barrel portion 710 and a flag-dispensing portion 720. The writing instrument 700 may have a cylindrical bottle-like configuration extending from a first end 740 to a second end 745. In particular, the barrel portion 710 may include a neck section 747 proximate to the first end 740, a tubular section 749 extending toward the second end 745 from the neck section 747, and a cone-like section 748 extending toward the second end 745 from the tubular section 749. The neck section 747 may be configured with a tip holder 750 located at the first end 740 and adapted to hold a protruding marking element (not shown).

The flag dispensing portion 720 includes a sliding cover portion 722 and a dispensing plug 724 (visible in FIG. 8). The dispensing plug 724 is configured to engage onto the cone-like section 748 of the barrel portion 710. The dispensing plug 724 is configured to store a stack of tape flags. The sliding cover portion 722 has a generally cylindrical shape and is configured to engage onto and circumferentially cover the dispensing plug 724.

The sliding cover portion 722 is configured to slide along the dispensing plug 724 in a longitudinal direction (the direction between ends 740 and 745). The sliding cover portion 722 slides along the dispensing plug 724 between a closed position, depicted in FIG. 7, and an open position, depicted in FIG. 8. With the sliding cover portion 722 in the closed position, the writing instrument 700 may have a slit 726 between the sliding cover portion 722 and the barrel portion 710. With the sliding cover portion 722 in the open position, the writing instrument 700 has an opening 826 between the sliding cover portion 722 and the barrel portion 710.

Ridges 730 on the sliding cover portion 722 allow a user to obtain a good grasp when sliding the sliding cover portion 722 between the open and closed positions. A tab 832 may be formed on the dispensing plug 724 and a slot 732 may be formed in the sliding cover portion 722 so that tab 832 frictionally engages with slot 732 when the sliding cover portion 722 is in the open position. The slot 732 and the tab 832 may form a detent, so that to move the sliding cover portion 722 back to the closed position, a user pushes the sliding cover portion 722 with enough force to overcome the detent and snap the sliding cover portion 722 back to the closed position. Alternatively, the slot 732 and the tab 832 may be formed as more rigid structures. In this alternative, a user presses the tab 832 so that the tab 832 disengages from the slot 732 and the cover portion 722 may be moved to the closed position.

The dispensing plug 724 has a mouth portion 725 adapted to dispense tape flags. The mouth portion 725 may be exposed when the sliding cover portion 722 is in the open position, and the mouth portion 725 may be covered and protected when the sliding cover portion 722 is in the closed position.

A stack of tape flags may be inserted into the dispensing plug 724 so that the stack of tape flags is disposed longitudinally in the dispensing plug 724. A protruding tape flag 727 is shown extending from the mouth portion 725 of the dispensing plug 724, and through the opening 826.

The dispensing plug 724 also has a nub portion 729 located at the second end 745 of the writing instrument 700. The nub portion 729 is dimensioned so that it snugly fits into a cap (not shown) that may also snugly fit onto neck section 747. The cap may be used to protect a writing tip when the writing instrument is not in use.

Figure 9:
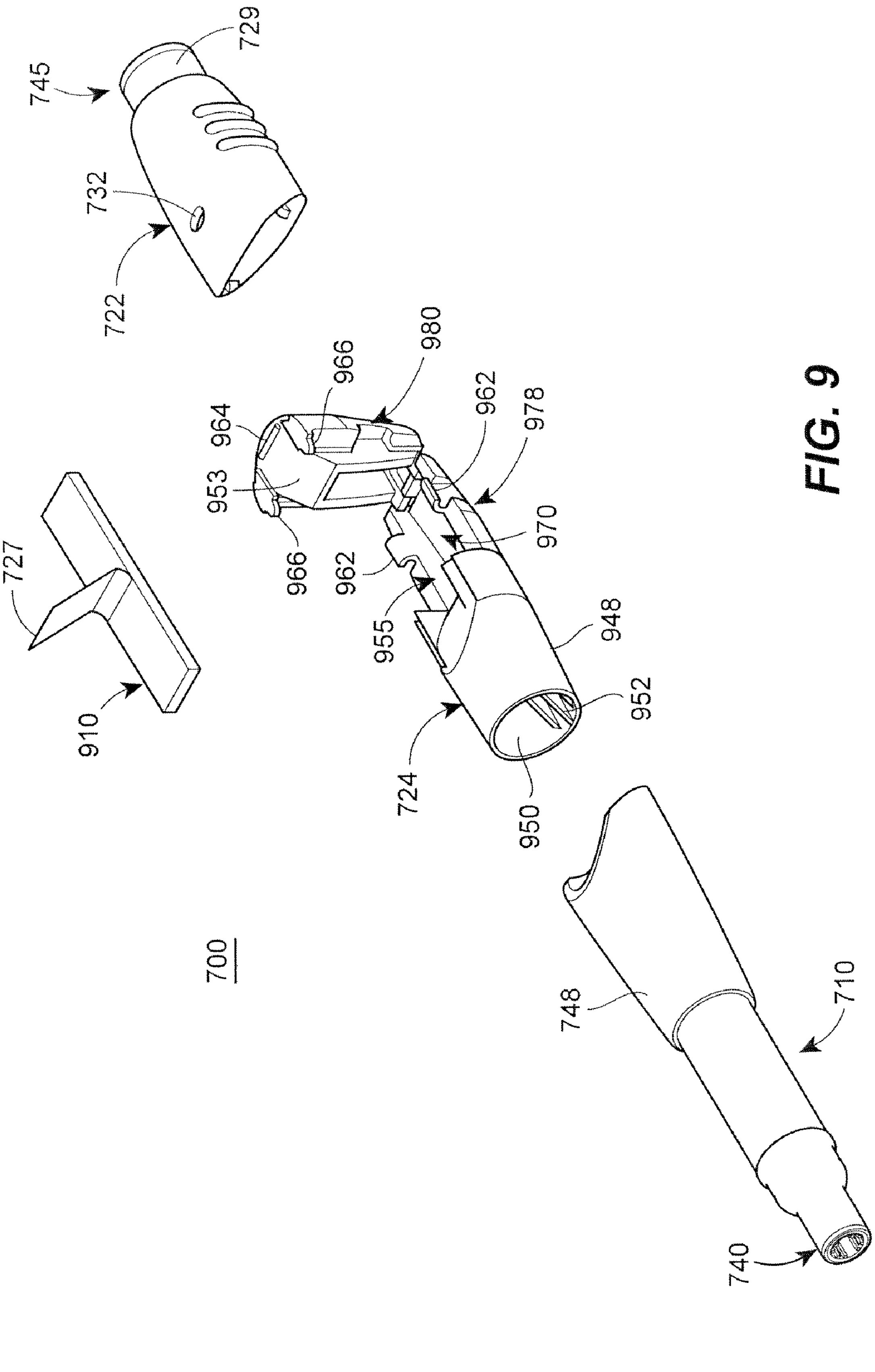
FIG. 9 illustrates an exploded view of the writing instrument configured to dispense tape flags of FIGS. 7 and 8.

FIG. 9 presents an exploded view of the writing instrument 700 from FIGS. 7 and 8. FIG. 9 shows the barrel portion 710, the dispensing plug 724, and the sliding cover portion 722. Also shown is a stack of tape flags 910 that may be inserted into the dispensing plug 724. The stack of tape flags 910 includes the tape flag 727 shown protruding from the writing instrument 700 in FIG. 8.

The barrel portion 710, the dispensing plug 724, and the sliding cover portion 722 are each separately made from injection-molded plastic. Also, other materials may be used in forming the components of the writing instrument 700, such as other partially pliable materials generally suitable for a writing instrument.

As illustrated in FIG. 9, the dispensing plug 724 has a hollow plug portion 948 extending along a central axis of the dispensing plug 724 in the direction of the first end 740. The hollow plug portion 948 is dimensioned to fit snugly into the cone-like section 748 of the barrel portion 710. A seal 1140 (FIG. 11) may be formed between the dispensing plug 724 and the barrel portion 710 to firmly join these components 710 and 724. The seal 1140 may be made of one or more circumferential locking rings formed onto the components 710 and 724. Alternatively, or in addition, the seal 1140 may be formed of a heat-treated or pressure-activated adhesive.

The hollow plug portion 948 may have an opening 950 that allows an internal region of the dispensing plug 724 to communicate with an internal region of the barrel portion 710 in writing instrument 700, and a ramp-shaped guide 952 that assists in aligning an ink cartridge in the barrel portion 710 during assembly of the writing instrument.

The dispensing plug 724 may have a flip-cover portion 980 that is flexibly attached to a main portion 978 of the dispensing plug 724. The flip-cover portion 980 opens away from the main portion 978 to reveal a tape-flag chamber 970. The stack of tape flags 910 may be placed in the tape-flag chamber 970 during assembly, and may additionally be refilled with tape flags by a user. The main portion 978 and the flip-cover portion 980 may be formed as one unit piece of injection-molded plastic, with a flexible plastic hinge joining the two components 978 and 980 together. Alternatively, the two components 978 and 980 may be formed separately and joined by a flexible or swiveling hinge.

The flip-cover portion 980 closes onto the main portion 978 to enclose and hold tape flags in the tape-flag chamber 970. When the flip-cover portion 980 is closed, the mouth portion 725 of the dispensing plug 724 is formed by a first surface 953 on the flip-cover portion 980 and by a second surface 955 on the main portion 978 of the dispensing plug 724. A set of nubs 964 and 966 and tabs 962 may be formed onto the dispensing plug 724 that are sized and positioned to engage associated mechanisms, thereby to lock the flip-cover portion 980 onto the main portion 978 of the dispensing plug 724.

FIG. 10 is a plan view of the writing instrument 700, in the direction facing the first end 740. FIG. 10 shows the ridges 730 of the sliding cover portion 722, the cone-like section 748, and the protruding tape flag 727.

FIGS. 11 and 12 are cross sections of the writing instrument 700 though the longitudinal sections 11-11 and 12-12, respectively, depicted in FIG. 10. FIGS. 11 and 12 show the barrel portion 710, the dispensing plug 724, the flip-cover portion 980, and the sliding cover portion 722.

As shown in FIG. 11, the initial tape flag 727 protrudes from the mouth portion 725, in a position ready for use. The initial tape flag 727 extends from the tape-flag chamber 970, where it is anchored onto the stack of tape flags 910. As shown, an adhesive portion of the initial tape flag 727 is affixed to a subsequent tape flag in the stack of tape flags 910. When a user pulls on the initial tape flag 727 to withdraw a flag from the writing instrument 700, the initial tape flag 727 in turn pulls on the subsequent tape flag. As the initial tape flag 727 is withdrawn form the mouth portion 725, the subsequent tape flag is drawn into the ready position, with a non-adhesive portion of the subsequent tape flag protruding from the mouth portion 725.

The dispensing plug 724 may have a throat portion defined by a guide plate 1126 and a nub 1128. The throat portion of the dispensing plug 724 is behind the mouth portion 725 of the dispensing plug 724. Tape flags drawn from the writing instrument 700 pass from the stack of tape flags 910 in the tape-flag chamber 970, through the throat portion of the dispensing plug 724 (between the guide plate 1126 and the nub 1128), and finally through the mouth portion 725.

The guide plate 1126 and the nub 1128 may be dimensioned so that the throat portion of the dispensing plug 724 has a half-hourglass shaped cross section, as shown in FIG. 11. The throat section may be dimensioned to facilitate the passage of tape flags therethrough. Similarly, the dimensions of the tape-flag chamber 970 may also be selected to facilitate the removal of tape flags. These dimensions are preferably adapted to an intended size of the tape flags in the stack of tape flags 910.

FIG. 11 further illustrates an interior cavity 1130 that is formed when the dispensing plug 724 is connected with the barrel portion 710. The interior cavity 1130 includes a barrel-portion cavity 1132 located inside the barrel portion 110, and a plug-portion cavity 1134 located inside the dispensing plug 724. The plug-portion cavity 1134 of internal cavity 1130 may extend substantially into the dispensing plug 724 as shown.

A set of baffles 1120 is mounted in an interior portion of the barrel portion 710 to assist in holding an ink cartridge in place. During assembly of the writing instrument 700, the ink cartridge may be inserted into the barrel portion 710. The dispensing plug 724 may then be attached to the barrel portion 710, enclosing the ink cartridge in the interior cavity 1130. The seal 1140 may be an ink-proof seal so that the interior cavity 1130 forms an ink reservoir around the ink cartridge.

Although the foregoing disclosure has illustrated the integration of a tape flag dispenser into a highlighter, the teachings of the disclosure may be applied to other writing instruments without departing from the scope or spirit thereof. The tape flag dispensers disclosed herein can be employed with other writing instruments such as, but not limited to, pens, pencils, and markers. Further, it can be appreciated by one having ordinary skill in the art that various embodiments of the invention can be made without all of the features discussed in the illustrative embodiments, and that features from the various illustrative embodiments can be intercombined as appropriate for specific applications and situations.

The invention claimed is:

1. A writing instrument with a sheet material dispenser comprising:

a barrel portion having an exterior grip surface;

a marking element coupled to a first end of the barrel portion;

a sheet-dispensing portion including a dispensing plug coupled to a second end of the barrel portion, the dispensing plug including a sheet chamber, a stack of sheet material disposed in the sheet chamber, a throat portion communicating with the sheet chamber, and a mouth portion through which an initial sheet of the stack of sheet material is adapted to protrude via the throat portion, the throat portion having a half hourglass-shaped cross-section defined between a guide plate and a nub disposed between the mouth portion and the sheet chamber, the guide plate and the nub having angled surfaces converging away from the sheet chamber such that the throat portion facilitates the removal of the sheet material; and a cover portion slidably coupled to the dispensing plug of the sheet dispensing portion and movable between an open position in which the mouth portion is exposed and a closed position in which the cover portion covers the mouth portion, wherein the dispensing plug comprises a main portion and a flip cover portion flexibly attached to the main portion, the flip cover portion being movable between an open position in which the sheet chamber is exposed and a closed position in which the flip cover portion substantially overlies the sheet chamber, and wherein the flip cover portion defines a first surface and the main portion defines a second surface such that the mouth portion is defined by the first and second surfaces when the flip cover portion is in the closed position.

2. The writing instrument of claim 1, in which the flip cover portion carries the guide plate and the main portion carries the nub, wherein the throat portion is defined between the guide plate and the nub when the flip cover portion is in the closed position.

3. The writing instrument of claim 1, in which the sheet material comprises a stack of tape flags.

4. The writing instrument of claim 1, in which the stack of sheet material comprises a stack of sheet material arranged in a zig-zag configuration.

5. A writing instrument with a sheet material dispenser comprising:

a barrel portion having an exterior grip surface;

a marking element coupled to a first end of the barrel portion;

a sheet-dispensing portion including a dispensing plug coupled to a second end of the barrel portion, the dispensing plug including a sheet chamber, a stack of sheet material disposed in the sheet chamber, a throat portion communicating with the sheet chamber, and a mouth portion through which an initial sheet of the stack of sheet material is adapted to protrude via the throat portion, the throat portion having a half hourglass-shaped cross-section defined between a guide plate and a nub disposed between the mouth portion and the sheet chamber, the guide plate and the nub having angled surfaces converging away from the sheet chamber such that the throat portion facilitates the removal of the sheet material; and a cover portion coupled to the dispensing plug and slidable in a longitudinal direction of the dispensing plug between an open position, in which the mouth portion is exposed, and a closed position, in which the mouth portion is covered, wherein the dispensing plug comprises a main portion and a flip cover portion flexibly attached to the main portion, the flip cover portion being movable between an open position in which the sheet chamber is exposed and a closed position in which the flip cover portion substantially overlies the sheet chamber, and wherein the flip cover portion carries the guide plate and the main portion carries the nub, wherein the throat portion is defined between the guide plate and the nub when the flip cover portion is in the closed position.

6. The writing instrument of claim 5, in which the flip cover portion defines a first surface and the main portion defines a second surface, wherein the mouth portion is defined by the first and second surfaces when the flip cover portion is in the closed position.

7. The writing instrument of claim 5, in which the sheet material comprises a stack of tape flags.

8. The writing instrument of claim 5, in which the stack of sheet material comprises a stack of sheet material arranged in a zig-zag configuration.

9. A writing instrument with a sheet material dispenser comprising:

a barrel portion having an exterior grip surface;

a marking element coupled to a first end of the barrel portion; and a sheet-dispensing portion including a dispensing plug coupled to a second end of the barrel portion, the dispensing plug including a sheet chamber, a stack of sheet material disposed in the sheet chamber, a throat portion communicating with the sheet chamber, and a mouth portion through which an initial sheet of the stack of sheet material is adapted to protrude via the throat portion, the throat portion having a half hourglass-shaped cross-section defined between a guide plate and a nub disposed between the mouth portion and the sheet chamber, the guide plate and the nub having angled surfaces converging away from the sheet chamber such that the throat portion facilitates the removal of the sheet material, wherein the dispensing plug further comprises a main portion and a flip cover portion flexibly attached to the main portion, wherein the flip cover portion is movable between an open position in which the sheet chamber is exposed and a closed position in which the flip cover portion substantially overlies the sheet chamber, wherein the flip cover portion defines a first surface and the main portion defines a second surface such that the mouth portion is defined by the first and second surfaces when the flip cover portion is in the closed position.

10. The writing instrument of claim 9, in which the flip cover portion carries the guide plate and the main portion carries the nub, wherein the throat portion is defined between the guide plate and the nub when the flip cover portion is in the closed position.

11. The writing instrument of claim 9, further comprising a cover portion slidably coupled to the dispensing plug between an open position, in which the mouth portion is exposed, and a closed position, in which the mouth portion is covered.

12. The writing instrument of claim 9, in which the sheet material comprises a stack of tape flags.

13. The writing instrument of claim 9, in which the stack of sheet material comprises a stack of sheet material arranged in a zig-zag configuration.

* * * * *

UNITED STATES PATENT AND TRADEMARK OFFICE

CERTIFICATE OF CORRECTION

PATENT NO. : 7,736,080 B2
APPLICATION NO. : 12/422003
DATED : June 15, 2010
INVENTOR(S) : Smith, Jr. et al.

It is certified that error appears in the above-identified patent and that said Letters Patent is hereby corrected as shown below:

<u>On the Title Page</u>

Item (62), "Division of application No. 11/039,512, filed on Jan. 18, 2005, now Pat. No. 7,517,167." should be -- Division of application No. 11/039,512, filed on Jan. 18, 2005, now Pat. No. 7,517,167. Provisional application No. 60/537,430, filed on Jan. 17, 2004. --.

Signed and Sealed this

Twenty-fourth Day of August, 2010

David J. Kappos
*Director of the United States Patent and Trademark Office*